ASYMMETRIC CRYOGENIC DEVICE

Filed Dec. 16, 1960

2 Sheets-Sheet 1

Inventors:
Vernon L. Newhouse,
Harold H. Edwards,
by John P. Dellitt
Their Attorney.

ASYMMETRIC CRYOGENIC DEVICE

Filed Dec. 16, 1960

2 Sheets-Sheet 2

Inventors:
Vernon L. Newhouse,
Harold H. Edwards,
by John P. Dellitt
Their Attorney.

United States Patent Office 3,182,275

Patented May 4, 1965

3,182,275

ASYMMETRIC CRYOGENIC DEVICE

Vernon L. Newhouse, Scotia, and Harold H. Edwards, Schenectady, N.Y., assignors to General Electric Company, a corporation of New York Filed Dec. 16, 1960, Ser. No. 76,324
11 Claims. (Cl. 338—32)

This invention relates to cryogenic electronic devices and more particularly to such devices which exhibit asymmetric impedance to the flow of current.

Certain electrical conductors are known to exhibit a loss of electrical resistance at super-cold temperatures approaching absolute zero and to regain this resistance in the presence of a specified magnetic field or alternatively a specified current therein. A switching device employing this phenomenon may be constructed by surrounding a first such conductor with a coil formed of a conducting material, means being provided to maintain the device below the temperature at which resistance in the first conductor substantially disappears. A current is passed through the coil surrounding the first material and when this current is raised to a value sufficient to produce a "critical" magnetic field within the coil, the first conductor returns to a resistive or normal state.

A similar switching device may be formed wherein a flat superconducting gate film is crossed by a closely related narrow grid film. Then when a predetermined current flows through the grid, the field set up by this current renders the underlying gate conductor resistive.

Various circuits and complex apparatus have been suggested which employ flat deposited cryogenic switching devices as basic elements. Such devices are especially useful in the field of large electronic computers where it is desirable to secure the maximum utilization of space. However, although the basic cryogenic switching device provides control of one current by another, the impedance of the device is symmetric or insensitive to the direction of current flow therein; the conventional cryogenic switching device is described as more analogous to a switch than to a diode, vacuum tube or transistor heretofore found exceedingly useful or almost irreplaceable in the electronic and computing arts. The asymmetric impedance of the latter devices gives rise to many well-known useful functions including rectification, detection, and gating at selected polarity levels.

It is therefore an object of the present invention to provide an improved cryogenic electronic device which presents an asymmetric impedance to an applied current.

It is another object of the present invention to provide an improved cryogenic electronic device operable as a switching device at selectable control currents and polarities.

It is another object of this invention to provide a cryogenic electronic device having combination switching and asymmetric impedance properties.

It is another object of this invention to provide an improved cryogenic electronic gate whose critical current, that is the current at which normal resistance returns, may be raised or lowered in response to an external signal.

Furthermore, although memory devices have been constructed employing cryogenic circuitry wired in flip-flop configurations or in persistent current loops each employing a plurality of cryotrons, single cryogenic switches have not heretofore had the attribute of remembering a previously applied control current.

It is therefore a further object of this invention to provide a single cryogenic electronic device having hysteresis characteristics for remembering a predetermined current set.

It is another object of this invention to provide an improved electronic cryogenic device having combination switching, memory, and asymmetric impedance properties.

In accordance with the present invention a superconducting gating element carrying current in a predetermined direction has positioned adjacent thereto, second "control" conductors which, when carrying a current in the same predetermined direction, produce magnetic field components directly opposing the normal magnetic field component perpendicular to the superconducting gate. It has been found that these opposing normal magnetic field components raise the critical current for the superconductor, that is the current at which its resistance returns. Likewise, when the additional or control conductors carry current in the substantially opposite direction, producing magnetic field components aiding the normal or perpendicular field component of the superconducting gate, the critical current for the superconductor is lowered.

Viewing the device another way, for current in a given direction in the aforementioned additional control conductors, the critical current encountered in the superconductor can be made substantially higher in a given direction of current flow than in the opposite direction of current flow, thereby providing an asymmetric impedance akin to a diode device. However, since the said additional conductors have control over the critical current in the superconducting gate, as well as acting to set up the direction of impedance asymmetry, the device is more akin to a triode than a diode.

In accordance with one aspect of the invention the superconducting gate takes the form of a deposited flat film on a supporting substrate and the additional control conductors are disposed lengthwise along each lateral edge of the flat film, and are interconnected such that current flows in the same direction in each control conductor. The control conductors are also preferably selected to display superconducting properties in order to alleviate the heating problem caused by a large number of cryogenic devices supported on a common substrate. The control conductors are then preferably constituted of a material having a higher critical magnetic field (at which conductor resistance returns) than the intermediate superconducting gate.

In accordance with another aspect of the present invention a similar cryogenic electronic device also comprised of a gate film with control conductors is interconnected such that the control conductors carry currents in opposite directions relative to one another. Such a circuit configuration produces a critical current characteristic for the central gate superconductor which exhibits a pronounced hysteresis effect. Therefore, the apparatus is useful as a memory device; the critical current required to render the controlled superconductor or gate resistive then indicates the last sense of applied currents in the control conductors. Thus a current "set" applied momentarily to the control conductors can be remembered indefinitely by the super-conducting gate.

The subject matter which we regard as our invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

Figure 2:
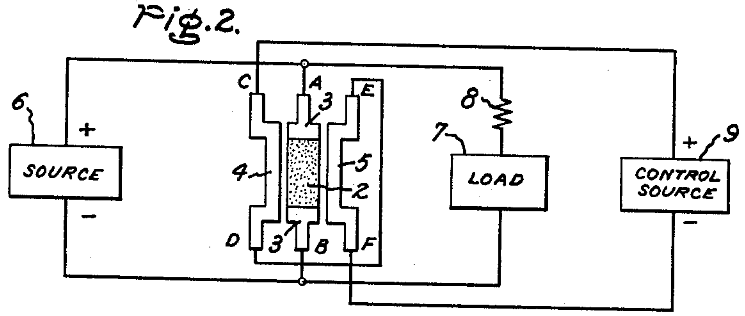
FIG. 2 is a circuit diagram illustrating a preferred method of operating the FIG. 1 device.
Figures 2A, 3, 3A, 4:
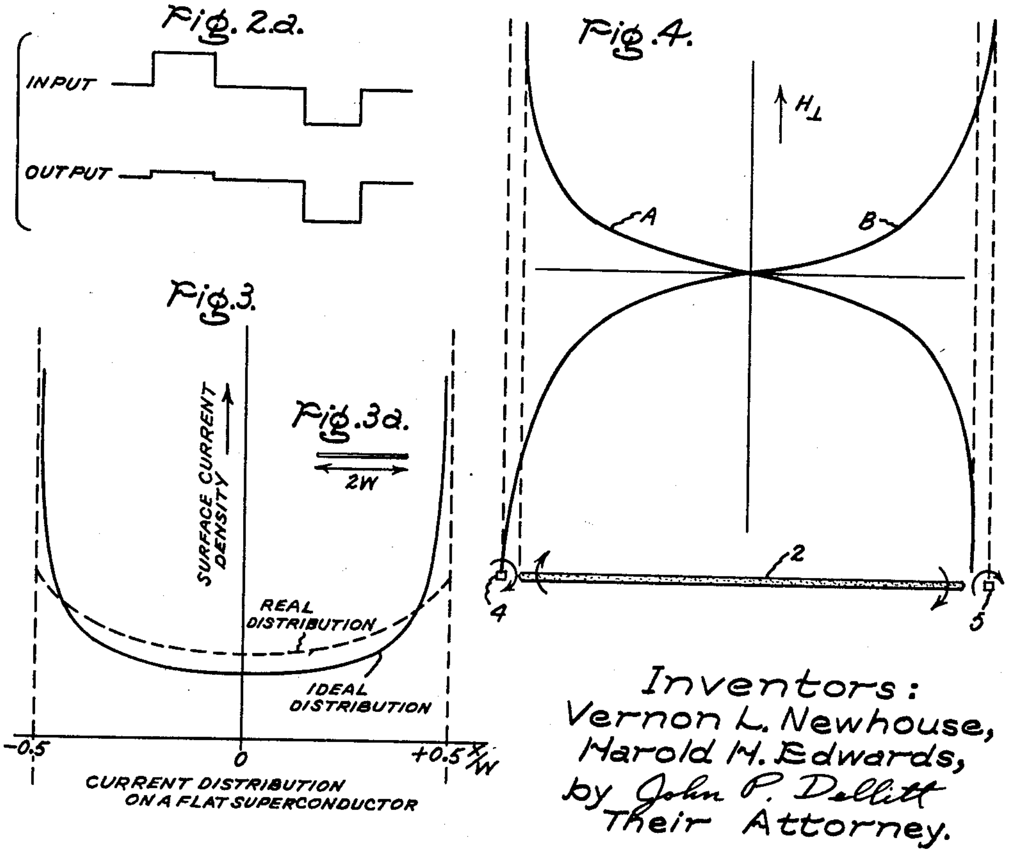
Figure 5:
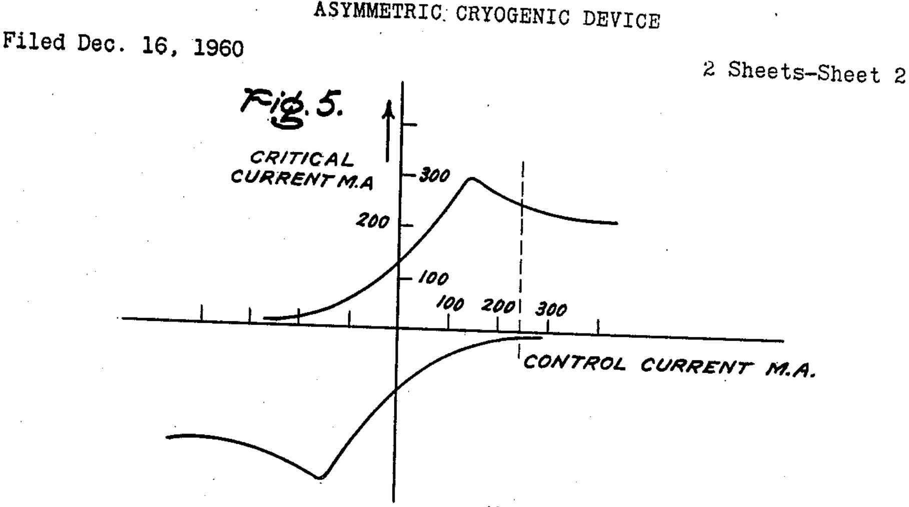
Figure 6:
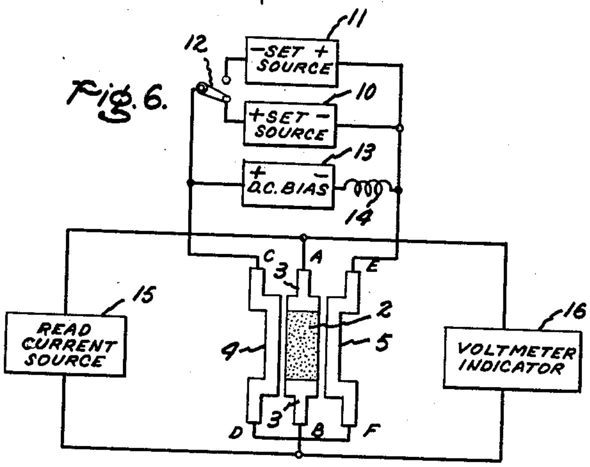
Figures 6A, 7:
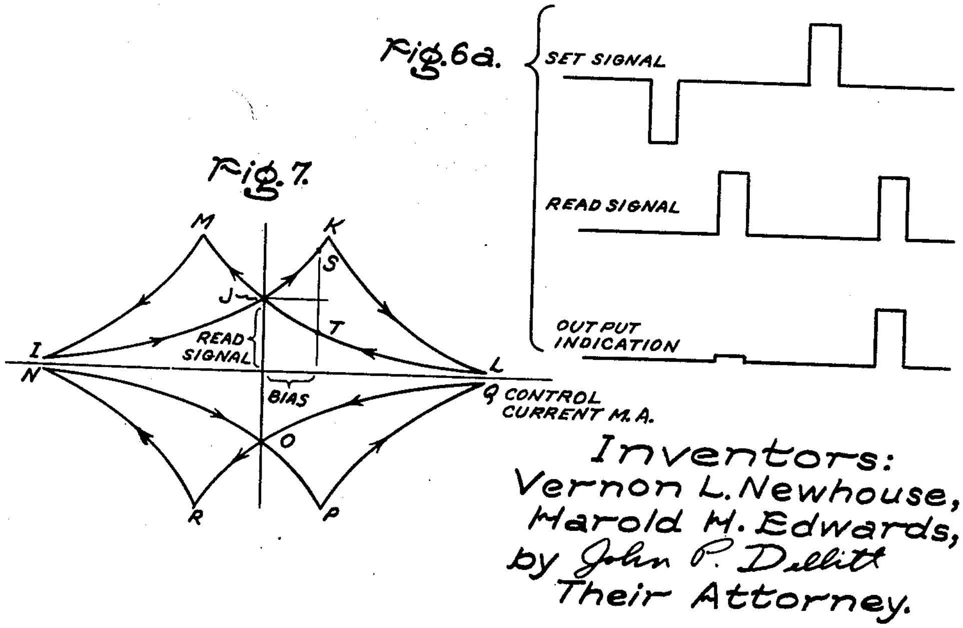

FIG. 2*a* is a chart of wave forms which may be observed for the FIG. 2 circuit;

FIG. 3 is a plot of transverse current distribution across a flat superconductor;

FIG. 3*a* is a cross-section of such a superconductor;

FIG. 4 is a plot of the normal, or perpendicular, field across a gate superconductor and control conductors according to the present invention;

FIG. 5 is a plot of critical current in a gate superconductor vs. control current passing through the control conductors for the connection depicted in FIG. 2;

FIG. 6 is a circuit diagram of the device according to the present invention employed as a memory element;

FIG. 6*a* is a chart of wave forms which may be observed for the FIG. 6 circuit, and FIG. 7 is a plot of critical gate current vs. control current for the connection illustrated in FIG. 6.

Figure 1:
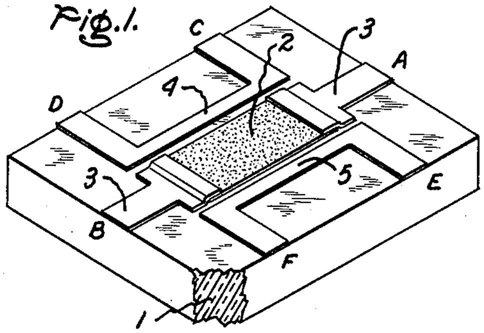
FIG. 1 is a perspective view of an asymmetric cryogenic electronic device according to the present invention.

Referring to FIG. 1 an insulating base 1 supports a relatively flat gate superconductor ribbon 2 with end conductors 3 deposited over the ends thereof to make connection therewith. Control conductors 4 and 5 are disposed in the same longitudinal direction as gate 2 and proximate the lateral edges thereof so that for current flow in the same direction as gate 2, the magnetic field generated by the former will oppose the normal or perpendicular magnetic field generated by the latter. Exact placement of the control conductors is not too critical. The control conductor edges may be spaced from the gate edges, or, alternatively, the control conductor edges may overlap the gate edges somewhat, without covering up the surface of the gate.

According to the specific construction of a particular embodiment of the invention, substrate 1 is insulating glass, gate conductor 2 is tin deposited to a depth of 0.3 micron being 2 millimeters long and 2 millimeters wide, and end conductors 3 as well a control conductors 4 and 5 are formed of lead. Tin and lead each have superconducting properties. Control conductors 4 and 5, having a depth of one micron and insulated from the gate, are spaced approximately 0.1 millimeter therefrom.

The base 1 need not be exclusive to one of the devices according to the present invention, but may act to support a large multiplicity of cryogenic devices in a complete circuit. A whole cryogenic apparatus including one or more circuits on one or more such bases may then be housed in refrigerating apparatus (not shown) for lowering the temperature to the superconducting region for the materials used. For the above materials a temperature of 3.5° K. is convenient.

At an operating temperature of 3.5° K., tin and lead material are characterized by critical fields of approximately 30 oersteds and 600 oersteds, respectively, in the presence of which the normal resistance for the particular conductor returns. For the device according to the present invention to be most useful, it is desired that the gate conductor at times exhibit resistance and at times not, in an asymmetrical manner, while the control conductors remain superconducting. Therefore the gate material is chosen to be tin with the lower critical field.

A superconductor also exhibits a characteristic critical current such that current more than critical current, passed through the superconductor, causes its resistance to return. Normally the critical current for a tin superconductor is also quite low.

The device depicted in FIG. 1 operates according to the present invention to present an asymmetric or unilateral impedance between end conductors 3, at either end of the gate superconductor 2, when a current is passed through each of the control conductors 4 and 5 in the same relative direction. Letting the letters A and B stand for two opposite ends of the gate superconductor circuit, the critical current in circuit direction A–B will vary depending upon the current in the control conductors. Letters C–D and E–F represent current flow directions in control conductors 4 and 5, respectively, generally parallel to circuit direction A–B. If current flows in directions C–D and E–F at a value of approximately 250 milliamperes for the specific construction described, the critical current for the passage of current in the direction A–B in gate 3 will be approximately 250 milliamperes; but, for the passage of current in direction B–A, critical current is encountered near 5 milliamperes. Thus for a substantial current value of approximately 100 milliamperes in circuit A–B, no resistance is encountered by the current flow, but appreciable resistance is encountered for current flow in direction B–A.

FIG. 2 illustrates the circuit employing this asymmetric phenomenon. In FIG. 2 a source of current pulses 6 is connected in parallel with end conductors 3 of the cryogenic electronic device according to the present invention and also in parallel with the serial combination of a load 7 which may be inductive, and a small resistance 8. A control source 9 is arranged to produce a positive control current and is connected to cause a serial flow of current in control conductors 4 and 5 in directions C–D and E–F.

FIG. 2*a* is a chart of waveforms illustrating the operation of the FIG. 2 circuit. It is seen that for a positive input pulse from a source 6 of the polarity indicated in FIG. 2, substantially no output is produced at load 7 for the reason that current flow from source 6 passes through end connections 3 and gate superconductor 2, which present no resistance to current flow, rather than through the circuit including small resistance 8 and load 7 presenting at least a small impedance to the current from source 6. It may be said then that substantially all of the current from source 6 passes through circuit A–B. However no voltage drop will be produced across circuit A–B inasmuch as the current encounters no resistance.

On the other hand, if a negative input pulse is produced by source 6, that is of opposite polarity to that indicated in FIG. 2, such a pulse will encounter appreciable resistance "R" in gate superconductor 2, R being greater than *r*, the resistance of resistor 8, chosen to be much the smaller. Therefore, a large proportion of current from source 6 is diverted to load 7, the circuit thus displaying the desired asymmetry.

The characteristic curve for the circuit of FIG. 2, employing the FIG. 1 device of the example dimensions given, is illustrated in FIG. 5 where critical current for gate superconductor 2 is plotted against control current flowing in directions C–D and E–F in control conductors 4 and 5. It is seen that a control source current in the region between 200 and 300 milliamperes will produce a pronounced asymmetric effect upon the critical current of gate 2 for opposite directions of current flow therein.

Although a parallel arrangement of source load and asymmetric device is indicated in FIG. 2, serial arrangements are also possible, if desired, which, for example, preferably would not employ a constant current source at 6.

The postulated theory of operation of the present device will be explained first with reference to an ordinary superconducting ribbon or film carrying a longitudinal current. Such a film is shown in cross-section in FIG. 3*a* where a current (less than critical) is assumed to be flowing in a direction perpendicular to the page, through the conductor of width 2W. It is also assumed that the conductor pictured is refrigerated to a temperature at which its constituent material ordinarily exhibits no electric resistance.

It is recognized that among the other attributes of such a superconductor is the property of acting as a diamagnetic shield. That is, the superconductor will act to repel magnetic lines of force which might otherwise pass through the superconductor, for example, perpendicularly therethrough. Because of this flux exclusion effect, the current distribution in the superconductor of FIG. 3*a* will try to adjust itself so that the normal field on its surface is zero. Such a current distribution is shown schematically by the solid line in FIG. 3, wherein the current density at the transverse edges of the film would assume a large value. This situation would, however, lead to supercritical parallel fields at the film edges, which in themselves would cause the return of resistance to the conductor. Hence the current density must readjust itself, presumably somewhat as shown by the dashed line in FIG. 3. The readjustment leads to a finite field component at right angles to the film, which in turn causes the film conductor to start to become normal at a much "lower" critical current than the film conductor could exhibit if the current in it were more uniformly distributed. The device according to the present invention acts to adjust the current distribution of the central gate superconductor under the control of currents in the edge conductors.

The manner in which the control conductors function to increase the critical current of the central superconducting gate is illustrated graphically in FIG. 4. In FIG. 4, curve A is a plot of the normal or perpendicular magnetic field across the width of the superconductor 2, whose current distribution is also given by the dashed curve in FIG. 3. It is observed that the perpendicular field at the middle of the superconductor gate is substantially zero while the field increases oppositely towards each edge. Now control conductors 4 and 5 are placed one adjacent each edge of central gate superconductor 2 and current is passed in the same direction through control conductors 4 and 5. The current flow in the control conductors 4 and 5 may then be adjusted to produce magnetic flux therearound which acts to oppose, cancel out or nullify the perpendicular flux produced by current in the superconductor gate 2. A perpendicular flux distribution due to the control current in control conductors 4 and 5 is plotted as curve B. The resultant critical current for the gate conductor 2 can thereby be increased to the maximum value of the FIG. 5 critical current plot, i.e., approximately 280 milliamperes for the particular device dimensions of the FIG. 1 embodiment.

The control conductor current required to produce maximum critical current in gate conductor 2 (i.e. to produce the field plot shown) is found in this embodiment to be approximately one-half the value of the critical current, i.e., approximately 140 milliamperes, as can be observed from the FIG. 5 critical current plot. The critical current for the gate 2 will then decrease as larger control currents are applied, since the field generated thereby may penetrate gate 2 somewhat. Also, of course, the critical current for gate conductor 2 decreases as the control current is decreased to smaller values than required to maximize gate critical current.

When the control current is reversed in polarity relative to the gate current, the critical gate current continues to drop and approaches zero in the vicinity of 250 milliamperes for the particular FIG. 1 device tested.

Since the apparatus depends primarily for its operation on the relative polarities of gate and control currents, it is apparent that the lower limit curve illustrated in FIG. 5 also describes the critical gate current threshold where current flows in the relative opposite direction through the gate. Thus for substantial gate current values, e.g., in the vicinity of 100 milliamperes for the embodiment of FIG. 1, the device exhibits distinctly asymmeric impedance to the flow of gate current.

The present device provides a useful new function in that an asymmetric impedance characteristic is achieved. However it is apparent that the device may be employed as a switch wherein currents in the control conductors cause resistance to appear in the gate superconductor. Alternatively, a combination of the two functions may be advantageously employed, for example, as a controlled rectifier.

The asymmetric device according to the present invention has thus far been illustrated with its control conductors 4 and 5 carrying current in the same relative direction. Certain other desirable properties are attained when the control conductors carry current in opposite directions. Such an arrangement is illustrated in the circuit diagram of FIG. 6.

Referring to FIG. 6, a positive set source 10 and a negative set source 11 are selectably connected by means of single pole double throw switch 12 in series with control conductors 4 and 5 of the asymmetric cryogenic device according to the present invention. A source of read current pulses 15 is paralleled with a circuit A–B including gate superconductor 2, and with a longer circuit including a voltage indicator 16 or a small resistance device and inductance. Control conductors 4 and 5 are arranged parallel to gate 2, with their directions C–D and E–F, respectively, generally physically parallel to A–B. The control conductors are then connected to form a serial circuit C–D–F–E wherein the same current is therefore conducted in opposite directions through the two control conductors. D.C. bias source 13 in series with a small inductance 14 is also shunted across the control conductor circuit C–D–F–E. Inductance 14 aids in equalizing the voltage drops in the circuit.

The configuration illustrated in FIG. 6 displays a pronounced hysteresis effect in the critical current characteristic of gate conductor 2. FIG. 7 is a plot of critical gate current vs. current in the control conductors for this configuration. It is observed that as control current is increased from zero, the critical current of gate 2 increases along curve J–K to a maximum K and then drops gradually to a low value at L. Then if the control current is decreased the critical current rises again to point J without going through a critical current maximum. This observed characteristic repeats for the four quadrants of control and gate current polarities.

A chart of wave forms illustrated in FIG. 6*a* sets forth a possible schedule for operation of the FIG. 6 circuitry. First, if a relatively negative "set" signal produced by set source 11 is applied to the serially connected gate conductors through switch 12, a point I will be reached in the FIG. 7 curve where the critical current will have reached a rather low value. Then if the "set" signal is removed, the critical current for gate 2 will rise along the curve I–J to a quiescent point S dictated by a bias current derived from bias source 14. If a positive read signal, having a magnitude J above the abscissa in FIG. 7, is now generated by read signal source 15, such read current will flow through circuit A–B inasmuch as the critical current of the gate superconductor 2 is not exceded; the current will prefer this path to the longer path including the voltage indicator 16. Furthermore, there is no voltage drop across zero-resistance circuit A–B and no output indication is produced.

If now a positive "set" signal from set source 10 is applied through switch 12 across circuit C–D–F–E, the critical current of gate conductor 2 will first rise to point K and then drop to a fairly low value as at L. Then when the "set" signal is removed, the critical current will rise only slightly to point T indicated by the permanent D.C. bias current across circuit C–D–F–E. Now, when a positive read current is applied having a value J above the abscissa in FIG. 7, it is seen that since the critical current of gate superconductor 2 is exceded, the read current will at least in part prefer the voltage indicator to circuit A–B which now contains resistance. In other words, a detected voltage drop exists across circuit A–B, giving an output.

The exemplary circuit set forth in FIG. 6 does not illustrate the only possible configuration of memory devices according to the present invention, nor the only manner in which one may be connected. Moreover other pulse schedules may be used and other utilization circuits or output circuits besides a simple voltage indicator may be substituted. Furthermore, a steady biasing field rather than a biasing current, can be applied to the device; for example, a second pair of control conductors may be installed proximate the edges of the gate superconductor 2, and such additional control conductors would then be supplied with a continuous bias current from an appropriate source.

From the foregoing it will be seen that various embodiments of the present invention furnish a number of desirable functions, among which are gating, unilateral conduction, memory, and combinations of such features. Other applications and variations will be apparent to those skilled in the art. Although devices have been described as preferably constructed employing a tin superconducting gate conductor and superconducting control conductors formed of lead, other well known superconducting materials having the desired differential in critical field strengths may be similarly utilized and the control conductors need not be superconducting. The embodiments of the device according to the present invention have been further illustrated as film devices deposited on a flat surface and therefore useful in large numbers in conjunction with other similar devices on a flat substrate, but it is apparent that the support and conductors of the present device need not be strictly flat nor is the present invention restricted to entirely planar devices.

Generally the asymmetric cryogenic electronic devices according to the present invention have been set forth as including a pair of control conductors, one disposed along each lateral edge of a somewhat flattened central gate superconductor, and such a configuration is clearly advantageous because it allows a large degree of control over the critical current of the gate conductor by effecting the normal field distribution along each edge of the gate superconductor. A single control conductor on the other hand would exert less than half the influence of two because the effects present at the other film edge would gain control. However, it is possible to obtain somewhat similar results, for example where space does not permit two edge conductors; a control conductor is then disposed proximate one edge of the gate superconductor which control conductor carries a current in the same direction as the gate superconductor and the magnetic field component produced by the control conductor opposes the normal magnetic field component of the gate superconductor, thereby raising its critical current.

Moreover the device according to the present invention may be advantageously employed as an "and" gate wherein the current in gate 2 is established at an intermediate value such that currents in both control conductors are required to maintain the gate superconducting while current in only one control conductor will allow the gate to become resistive. Other such logical operations are possible in accordance with the present device.

While we have thus shown and described several embodiments of our invention, it will be apparent to those skilled in the art that many other changes and modifications may be made without departing from our invention in its broader aspects; and we therefore intend the appended claims to cover all such changes and modifications as fall within the true spirit and scope of our invention.

What we claim as new and desire to secure by Letters Patent of the United States is:

1. An asymmetric conduction device comprising a supporting base, a first superconductor flattened to said supporting base and providing only a single path for current flow, the contour of said superconductor presenting laterally spaced conducting edges extending longitudinally of said superconductor with a central flat current carrying area therebetween, second conductors extending longitudinal of said superconductor principally proximate only the edges thereof rather than said central area, and means for applying current to said second conductors to generate a field principally near the edges of said superconductor for raising the critical current of said superconductor when a current is passed in the longitudinally same direction in said superconductor as said second conductors and lowering the critical current of said superconductor when a current is passed in the longitudinally opposite direction in said superconductor.

2. The device as set forth in claim 1 wherein said second conductors also exhibit superconducting properties.

3. An asymmetric conduction device comprising: a supporting base; a unitary superconductor deposited on said base exhibiting a critical current characteristic and having a greater transverse dimension than its height above said base, said superconductor providing only a single path for current flow; a pair of other conductors lengthwise of said superconductor each adjacent one lateral edge of said superconductor and not the other lateral edge and providing generally independent current paths for carrying current in a selected direction to increase the critical current of said superconductor for current flow in the same selected direction and decreasing the critical current for current flow in the opposite direction; and coupling means for carrying selected currents to said superconductor and said conductors.

4. A cryogenic device comprising a relatively flat superconductor carrying a current in its longitudinal direction in a single current flow path, a first additional conductor immediately proximate only one lateral edge of said flat superconductor, and a second additional conductor immediately proximate only the opposite lateral edge of said same superconductor, means for applying a current in a common direction in said additional conductors creating an edge field relative to said superconductor which causes said superconductor to have a larger critical current for current flow in the same direction therein and a smaller critical current for current flow in the opposite direction, said edge field for current flow in opposite directions in said additional conductors causing said superconductor to retain a set indicative of the direction of applied currents in said additional conductors.

5. An asymmetric conducting device comprising a base providing an insulated support, a superconductor gate film supported on said base and providing only a single current flow path, said gate film having the properties of losing resistance at low temperatures and exhibiting a critical current and a critical field at which resistance returns, means for coupling current to said gate film, first and second additional superconductor films disposed proximate the edges of said gate film and insulated therefrom, said additional superconductors having a greater critical field than said gate film and each being adjacent only one edge of the gate film without covering the area of said gate film therebetween, and means for coupling selected currents to said additional conductors.

6. The device as set forth in claim 5 wherein said gate film is substantially composed of tin at least over the majority of its length, wherein said additional conductors are substantially composed of lead, and wherein end connections are provided to said gate film, said end connections also being formed of lead.

7. A superconductor providing only a single current flow path having the properties of losing electrical resistance at low temperatures and exhibiting a critical current and a critical field at which resistance returns, said superconductor being provided with coupling means suppling a current in a predetermined direction producing surface-normal and surface-parallel magnetic field components relative to said superconductor, and first and second conductors providing a generally independent current path positioned adjacent the superconductor, each being adjacent only one edge of the superconductor and not the other without covering the area of said superconductor therebetween, and means for coupling current to both said conductors in the same predetermined direction producing magnetic field components directly opposing said normal magnetic field component of said superconductor for raising the critical current exhibited by said superconductor.

8. The apparatus set forth in claim 4 wherein said second conductor is also a superconductor.

9. An asymmetric conduction device comprising a relatively flat superconductor providing only a single path for current flow, a first additional conductor proximate only one lateral edge of said superconductor, a second additional conductor proximate only the opposite lateral edge of the same superconductor, and circuit means coupling said first and said second additional conductors to carry control current in the same direction relative to one another for producing an edge field relative to said superconductor for increasing the critical current of said superconductor.

10. A cryogenic device comprising a relatively flat superconductor providing only a single path for current flow, a first additional conductor proximate only one lateral edge of said superconductor, a second additional conductor proximate only the opposite lateral edge of the same superconductor, and circuit means coupling said first and said second additional superconductor to carry control current in opposite directions relative to one another causing said superconductor to retain a set indicative of the direction of applied control current in said additional conductors.

11. The device according to claim 10 further including biasing means for applying a quiescent current to said control conductors in the absence of said control current.

References Cited by the Examiner

UNITED STATES PATENTS

| | | | |
|---|---|---|---|
| 2,930,908 | 3/60 | McKeon | 340—173.1 |
| 2,938,160 | 5/60 | Steele | 338—32 |
| 2,958,836 | 11/60 | McMahon | 338—32 |
| 2,989,715 | 6/61 | Welker et al. | 338—32 |
| 3,076,102 | 1/63 | Newhouse et al. | 338—32 |

RICHARD M. WOOD, *Primary Examiner.*